United States Patent [19]

Wiggen

[11] Patent Number: 4,635,780
[45] Date of Patent: Jan. 13, 1987

[54] CLUTCH DISC FOR A MOTOR VEHICLE FRICTION CLUTCH

[75] Inventor: Peter Wiggen, Grafenrheinfeld, Fed. Rep. of Germany

[73] Assignee: Fichtel & Sachs AG, Schweinfurt, Fed. Rep. of Germany

[21] Appl. No.: 669,592

[22] Filed: Nov. 8, 1984

[30] Foreign Application Priority Data

Nov. 11, 1983 [DE] Fed. Rep. of Germany ....... 3340896

[51] Int. Cl.$^4$ ............................................. F16D 13/38
[52] U.S. Cl. ................................. 192/106.2; 192/70.17; 464/68
[58] Field of Search ............... 192/106.1, 106.2, 70.17; 464/64, 66, 68

[56] References Cited

U.S. PATENT DOCUMENTS

| 4,537,296 | 8/1985 | Lech, Jr. et al. | 192/106.2 |
| 4,549,641 | 10/1985 | Ootani et al. | 192/106.1 |

FOREIGN PATENT DOCUMENTS

| 7538331 | 5/1976 | Fed. Rep. of Germany . | |
| 0033328 | 12/1967 | Japan | 192/106.2 |
| 1235699 | 6/1971 | United Kingdom | 192/106.2 |
| 2054098 | 2/1981 | United Kingdom | 192/106.2 |
| 2103758 | 2/1983 | United Kingdom | 192/106.2 |
| 2133115 | 7/1984 | United Kingdom . | |
| 2135427 | 8/1984 | United Kingdom . | |
| 2141209 | 12/1984 | United Kingdom . | |
| 2141206 | 12/1984 | United Kingdom . | |

Primary Examiner—Rodney H. Bonck
Assistant Examiner—Alan G. Towner
Attorney, Agent, or Firm—Toren, McGeady, Stanger, Goldberg & Kiel

[57] ABSTRACT

The clutch disc for a motor vehicle friction clutch comprises a hub (1) and a friction lining carrier mounted rotatably through a limited angle of rotation on the hub (1), with side discs (9, 11) firmly connected into one unit and arranged axially on both sides of a hub flange (7). The friction lining carrier is mounted through a guide ring (15) on the hub (1). The guide ring (15) comprises a ring part (41), which can be a component of a friction damper (29), and a ring extension piece (53) guiding the friction lining carrier radially on the hub (1). The ring extension piece (53) is made radially resilient and centers the friction lining carrier radially without play on the hub (1). The guide ring (15) can comprise axial tongues or a coating of elastic material for the generation of initial radial stress forces.

8 Claims, 5 Drawing Figures

CLUTCH DISC FOR A MOTOR VEHICLE FRICTION CLUTCH

BACKGROUND OF THE INVENTION

The invention relates to a clutch disc for a motor vehicle friction clutch.

From Fed. German Utility Model No. 75 38 331 a clutch disc for a motor vehicle friction clutch is known on the hub of which two side discs connected into one unit together with the clutch friction linings are mounted axially on both sides of a hub flange. The side disc unit is guided radially and axially by a guide ring which is arranged with an annular disc part between one of the two discs and the hub disc and guides the side disc unit radially with a bearing extension part reaching into the annular space between this side disc and the hub.

By reason of the manufacturing tolerances of the hub and the side discs, the side disc unit has a relatively great radial tolerance play, which is further increased in operation by reason of wear. However the exact mounting of the side discs, since they are a constituent of friction dampers of the clutch disc, is one of the prerequisites for the friction force of the friction damper remaining within predetermined limits for the longest possible working life.

OBJECT OF THE INVENTION

An object of the invention is to improve a clutch disc for a motor vehicle friction clutch so that despite low construction expense the side discs connected with the clutch friction linings can be mounted on the hub with minimum possible radial play.

A further object is to ensure that the friction force of the friction damper of the clutch disc remains within predetermined tolerance limits over a relatively long period of time.

SUMMARY OF THE INVENTION

According to the invention there is provided a clutch disc for a motor vehicle friction clutch comprising a hub having a radially protruding hub disc, two side discs of substantially annular disc form enclosing the hub, which are arranged on axially opposite sides of the hub disc and are firmly connected with one another to form one unit which is rotatable through a limited angle of rotation in relation to the hub disc, a guide ring having an annular disc part arranged axially between one of the two side discs and the hub disc and determining the axial position of this side disc in relation to the hub, and having a bearing extension part protruding axially of this side disc from the annular disc part, which part extends into an annular space between this side disc and the hub and guides this side disc radially on the hub, at least one torsional vibration damper with at least one damping spring which is resiliently stressable in the relative rotation of the side discs and the hub, at least one friction damper with an axially acting spring which braces the one side disc against the hub disc through the annular disc part of the guide ring, and clutch friction linings which are connected at least with one of the side discs, said bearing extension part of the guide ring being made radially elastic and being braced with initial radial stress in between the inner circumference of the one side disc and the hub.

Such a guide ring centers the side disc unit without play on the hub and compensates for production tolerances. By reason of its radial elasticity wear occurring in operation is also compensated.

The guide ring, including its bearing extension part, preferably consists of a friction material so that not only its annular disc part but also the bearing extension part, by reason of the radial spring properties of the bearing extension part, can be used as friction ring of a friction damper. However the guide ring can also consist of a slip-favoring material.

In a preferred form of embodiment the bearing extension part is divided by slots into a plurality of radially resilient tongues distributed in the circumferential direction and protruding approximately axially at least in the installed condition. In the uninstalled condition the tongues protrude towards the axis of rotation of the clutch disc at an angle of more than 90 degrees, preferably more than 120 degrees, to the plane of the annular disc part.

Alternatively the guide ring can be produced from a nearly rigid material without substantial inherent elasticity, if for the production of the radial initial stress at least the bearing extension part is coated with an elastic material. The radial material thickness of the elastic coating, inclusive of the bearing extension part, is of such thickness that the layered structure is seated elastically resiliently between the internal circumference of the side disc mounted on the guide circumference and the hub. In this form of embodiment again the bearing extension part is preferably axially slotted.

The guide ring, especially if it consists of a friction material and is a constituent of a friction damper, is preferably held non-rotatably on the side disc mounted against it, and the non-rotatable connection can be produced by shape engagement, for example by noses and openings, or by adhesion of the ring part to the side plate.

BRIEF DESCRIPTION OF DRAWINGS

Examples of embodiment of the invention are to be explained in greater detail below by reference to drawings, wherein.

DESCRIPTION OF PREFERRED EMBODIMENTS

Figure 1:
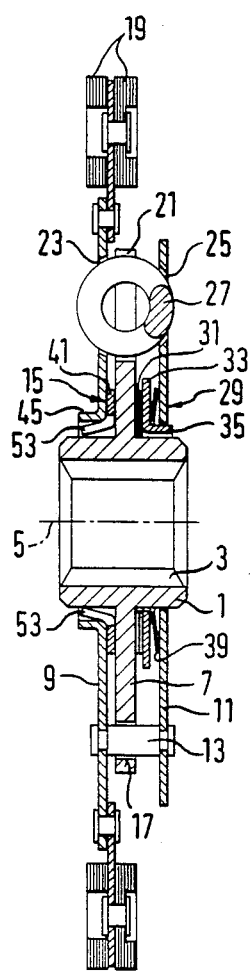
FIG. 1 shows an axial longitudinal section through a clutch disc for a motor vehicle friction clutch.

FIG. 1 shows a clutch disc for a motor vehicle friction clutch having a hub 1 which is couplable non-rotatably but axially displaceably by means of an internal toothing 3 with a gear input shaft (not shown further) rotating about a rotation axis 5. From the hub 1 a hub flange or hub disc 7 protrudes radially. Axially on both sides of the hub disc 7 there are arranged side discs 9, 11 which are firmly connected into one unit with one another by spacer rivets 13. The unit is mounted rotatably on the hub 1 by means of a guide ring 15 which will be explained in greater detail below, while the spacer rivets 13 pass through openings 17 of the hub disc 7 and limit the angle of rotation. Clutch friction linings 19 are secured to the side disc 9.

Helical compression springs 27 of a torsion spring damper are seated in mutually associated windows 21 of the hub disc 7 for the one part and windows 23, 25 of the side discs 9, 11 for the other part. In the relative rotation of the hub disc 7 and of the side discs 9, 11 the helical compression springs 27 are subjected to compression stress and damp rotational vibrations of the clutch disc.

Figure 2:
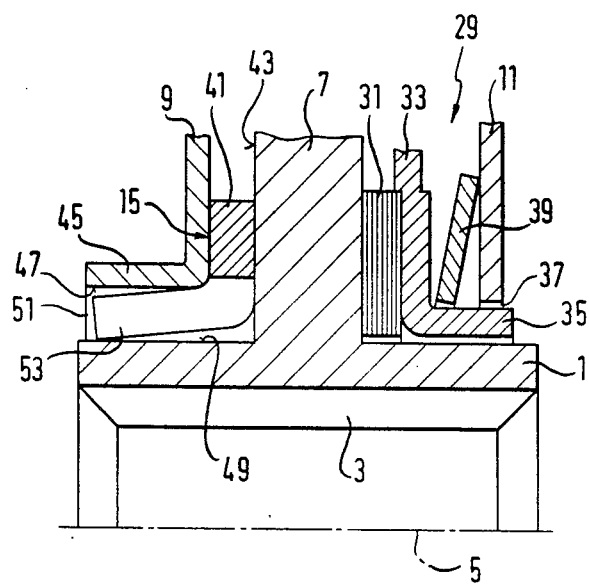
FIG. 2 shows an enlarged representation of the hub region of the clutch disc according to FIG. 1.

29 designates a friction damper of the clutch disc which is dimensioned preferably for idling. The clutch disc can comprise further friction dampers dimensioned for operation under load. Alternatively the friction damper 29 can be dimensioned for operation under load. It comprises, as best shown by FIG. 2, a friction ring 31 axially between the hub disc 7 and a pressure ring 33 axially between the friction ring 31 and the side disc 11. The presser ring 33 comprises noses 35 protruding axially from the hub disc 7, which engage in openings 37 of the side disc 11 and guide the presser ring 33 non-rotatably but axially displaceably on the side disc 11. Axially between the presser ring 33 and the side disc 11 there is clamped in an axially acting spring 39, especially a dished spring, which is supported with its internal circumference on the presser ring 33 and initially stresses the latter, through the friction ring 31, towards the hub disc 7. The external circumference of the spring 39 is supported on the side disc 11 and stresses the side disc 9, firmly connected with the side disc 11, through a ring part 41 of the guide ring 15 against the side face 43 of the hub disc 7 facing axially away from the friction ring 31.

Figure 3:
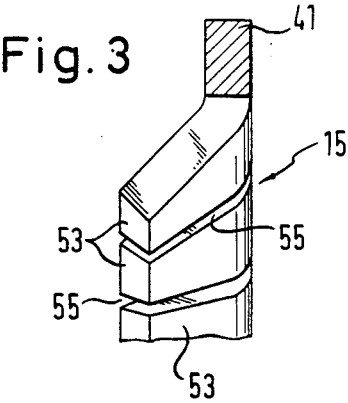
FIG. 3 shows a guide ring of the clutch disc according to FIG. 1 before its installation.

The side disc 9 is provided on its internal circumference with a cylindrical collar 45 pointing axially away from the hub disc 7 and forming an annular gap 51 between the internal periphery 47 and the external periphery 49 of the hub 1. From the internal periphery of the ring part 41, which is placed substantially in a plane extending perpendicularly of the rotation axis 5, several tongues 53 distributed in the circumferential direction protrude axially into the annular space 51. The tongues 53 are separated from one another by slots 55 (FIG. 3) and are radially initially stressed so that with their free ends they rest on the external periphery 49 of the hub 1 (FIG. 2) and at their foot point adjacent to the ring part 41 they guide the region of transition from the collar 45 to the side disc 9. The tongues 53 center the side discs 9, 11 and the clutch friction linings 19 in relation to the hub 1 and compensate for play, caused in production, between the hub 1 and the side disc 9. In order to achieve a sufficiently great radial initial stress force, the angle at which the tongues 53 are inclined in relation to the ring part 41, when the guide ring 15 is not installed, is made considerably greater than 90 degrees, preferably greater than 120 degrees (FIG. 3).

The guide ring 15 consists of a friction material so that its ring part 51 can be utilised as friction ring of the friction damper 29. A further friction torque is generated by the tongues 53 rubbing on the external periphery 49 of the hub 1. The friction ring 41 is preferably secured, for example stuck, to the side disc 9. Shape-engaging connections are likewise suitable.

The guide ring 15 is expediently produced from spring sheet steel and can be coated with friction material. Alternatively the guide ring 15 can be produced from synthetic plastics material, preferably polytetrafluoroethylene. Especially when synthetic plastics material is used, the slots 55 as represented in FIG. 3 can be omitted and the bearing extension part engaging in the annular space 51 can be produced by shaping by means of a mandrel-type tool from a disc material forming the ring part. Such a closed bearing extension generates sufficiently great initial radial stress forces. Here again the bearing extension has before fitting, apart from the slots 55, the form as represented in FIG. 3, which is transferred by installation into the form according to FIG. 2. A guide ring of this kind has the advantage of good wear resistance. Moreover, relatively low friction values can be maintained exactly, which is advantageous in the case where the friction damper is dimensioned as an idling friction damper.

Figure 4:
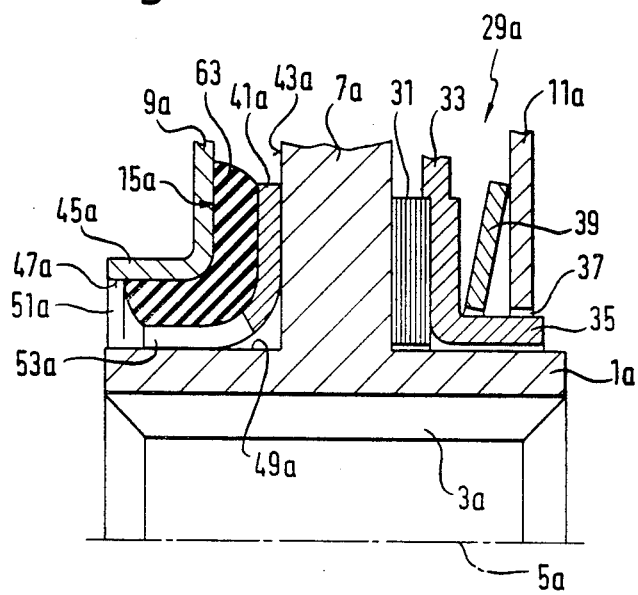
FIG. 4 shows an axial longitudinal section through another form of embodiment of the hub region of a clutch disc similar to the clutch disc in FIG. 1.
Figure 5:
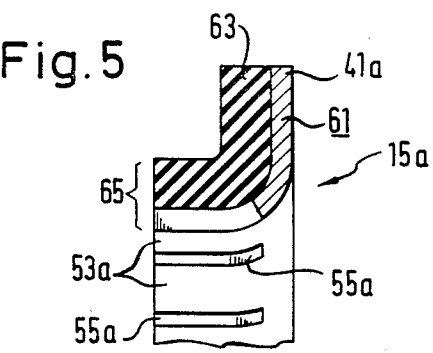
FIG. 5 shows an axial longitudinal section through a guide ring of the clutch disc according to FIG. 4, before its installation.

FIGS. 4 and 5 show the hub region of a clutch disc for a motor vehicle friction clutch which differs from the clutch disc of FIGS. 1 and 2 merely in the form of its guide ring 15a, corresponding to the guide ring 15. Otherwise, components having the same effect are designated with the reference numerals of FIGS. 1 and 2 and additionally with the letter a. For further explanation therefore reference is made to the description of FIGS. 1 to 3.

The guide ring 15a comprises a carrier part, designated generally by 61, of a nearly rigid, only slightly flexible material. Again from its ring part 41a tongues 53a separated from one another by slots 55a protrude, but here at an angle amounting to about 90 degrees, axially into the annular gap 51a formed by the collar 45a of the side disc 9a and the external periphery 49a of the hub 1a. The carrier part 61 is coated on its surface facing the side disc 9a with a coating 63 of an elastic, preferably rubber-elastic, material which in the installed condition (FIG. 4) provides for the elastic initial stress in the region of the tongues 53a. FIG. 5 shows the coating 63 before installation into the clutch disc, the material thickness 65 of the coating 63 and of the tongues 53a being greater than the radial width of the annular space 51a. The carrier 61 can consist of a friction material suitable for the friction damper 29a and is guided non-rotatably on the side disc 9a preferably through noses (not shown further). The elastic properties of the coating 63 axially between the side disc 9a and the ring part 41a can be used to contribute to the generation of initial stress force of the friction damper 29a.

I claim:

1. A clutch disc for a motor vehicle friction clutch comprising:

(a) a hub having a radially protruding hub disc;

(b) two side discs of substantially annular disc form enclosing the hub, which are arranged on axially opposite sides of the hub disc and are firmly connected with one another to form one unit which is rotatable through a limited angle of rotation in relation to the hub disc;

(c) a guide ring having an annular disc part arranged axially between one of the two side discs and the hub disc and determining the axial position of this side disc in relation to the hub, and having a bearing extension part protruding axially towards this side disc from the annular disc part, which part extends into an annular space between this side disc and the hub and guides this side disc radially on the hub;

(d) at least one torsional vibration damper with at least one damping spring which is resiliently stressable in the relative rotation of the side discs and the hub;

(e) at least one friction damper with an axially acting spring which braces the one side disc against the hub disc through the annular disc part of the guide ring; and (f) clutch friction linings which are connected at least with one of the side discs, said bearing extension part of the guide ring being made radially elastic and being braced with initial radial stress in between the inner circumference of the one side disc and the hub, the bearing extension part is formed by a plurality of radially resilient tongues distributed in the circumferential direction and protruding from the internal circumference of the annular disc part.

2. A clutch disc according to claim 1, wherein the tongues, before their installation in the clutch disc, protrude from the annular disc part at an angle of more than 90 degrees to the plane of the latter.

3. A clutch disc according to claim 1, wherein the guide ring consists of synthetic plastics material and comprises a bearing extension part closed in ring form and widened out by deforming pressure working.

4. A clutch disc according to claim 1, wherein the guide ring consists of friction material and forms a friction ring of the friction damper.

5. A clutch disc according to claim 1, wherein the guide ring is connected non-rotatably with the one side disc.

6. A clutch disc for a motor vehicle friction clutch comprising:

(a) a hub having a radially protruding hub disc, (b) two side discs of substantially annular disc form enclosing the hub, which are arranged on axially opposite sides of the hub disc and are firmly connected with one another to form one unit which is rotatable through a limited angle of rotation in relation to the hub disc;

(c) a guide ring having an annular disc part arranged axially between one of the two side discs and the hub disc and determining the axial position of this side disc in relation to the hub, and having a bearing extension part protruding axially towards this side disc from the annular disc part, which part extends into an annular space between this side disc and the hub and guides this side disc radially on the hub;

(d) at least one torsional vibration damper with at least one damping spring which is resiliently stressable in the relative rotation of the side discs and the hub;

(e) at least one friction damper with an axially acting spring which braces the one side disc against the hub disc through the annular disc part of the guide ring; and (f) clutch friction linings which are connected at least with one of the side discs, said bearing extension part of the guide ring being made radially elastic and being braced with initial radial stress in between the inner circumference of the one side disc and the hub, the guide ring comprises a carrier part of a nearly rigid material, wherein at least the region of the carrier part forming the bearing extension part carries a coating of elastic material and wherein the total radial material thickness of the coating and of the region forming the bearing extension part, before installation in the clutch disc, is greater than the radial width of the annular space between the internal circumference of the one side disc and the hub which accommodates the bearing extension part, the region of the carrier part which forms the bearing extension part is axially slotted to form radially flexible tongues.

7. A clutch disc according to claim 6, wherein the coating of elastic material also covers the region of the carrier part which forms the annular disc part of the guide ring.

8. A clutch disc according to claim 6, wherein the coating is fitted on the side of the carrier part which faces the one side disc.

* * * * *